(12) United States Patent
Yamazoe et al.

(10) Patent No.: US 9,027,864 B2
(45) Date of Patent: May 12, 2015

(54) WEBBING RETRACTOR

(75) Inventors: Hiroaki Yamazoe, Aichi-ken (JP);
Yusuke Hirokawa, Aichi-ken (JP)

(73) Assignee: KABUSHIKI KAISHA TOKAI-RIKA-DENKI-SEISAKUSHO, Aichi-Ken (JP)

( * ) Notice: Subject to any disclaimer, the term of this patent is extended or adjusted under 35 U.S.C. 154(b) by 790 days.

(21) Appl. No.: 13/230,050

(22) Filed: Sep. 12, 2011

(65) Prior Publication Data
US 2012/0067994 A1 Mar. 22, 2012

(30) Foreign Application Priority Data

Sep. 17, 2010 (JP) ................................. 2010-209405

(51) Int. Cl.
*B60R 22/38* (2006.01)
*B60R 22/46* (2006.01)

(52) U.S. Cl.
CPC ......... *B60R 22/4633* (2013.01); *B60R 22/4676* (2013.01)

(58) Field of Classification Search
CPC .................. B60R 22/4633; B60R 22/4676
USPC ........................ 242/374, 379; 280/806, 807; 297/475–478, 480
See application file for complete search history.

(56) References Cited

U.S. PATENT DOCUMENTS

| | | | | |
|---|---|---|---|---|
| 3,880,379 | A * | 4/1975 | Booth | 200/61.58 B |
| 5,794,876 | A * | 8/1998 | Morizane et al. | 242/374 |
| 6,343,522 | B1 * | 2/2002 | Hori et al. | 74/422 |
| 6,698,677 | B1 * | 3/2004 | Happ et al. | 242/374 |
| 6,837,520 | B2 * | 1/2005 | Singer | 280/807 |
| 2003/0094805 | A1 | 5/2003 | Mori | |
| 2004/0227030 | A1 * | 11/2004 | Nagata et al. | 242/374 |
| 2005/0211816 | A1 * | 9/2005 | Takamatsu et al. | 242/374 |
| 2006/0169821 | A1 * | 8/2006 | Kitazawa et al. | 242/382 |
| 2009/0057466 | A1 * | 3/2009 | Choi et al. | 242/377 |
| 2009/0134691 | A1 | 5/2009 | Choi et al. | |

(Continued)

FOREIGN PATENT DOCUMENTS

| | | |
|---|---|---|
| EP | 0940603 A2 | 9/1999 |
| EP | 1728694 A1 | 12/2006 |

(Continued)

OTHER PUBLICATIONS

EP search report—corresponding EP Application 11181535.3-1523 dated Nov. 22, 2011.

(Continued)

*Primary Examiner* — Sang Kim
(74) *Attorney, Agent, or Firm* — Roberts Mlotkowski Safran & Cole P.C.

(57) ABSTRACT

In a webbing retractor, the center of a rack and rack-teeth in an axial direction of a pinion is placed on the opposite side of a leg plate side with respect to the central axis of a cylinder. The piston is acted upon by a tilting-force toward the leg plate side from the pinion. A stop portion of an upper stay is placed on another leg plate side of the leg plate. Even when the piston is acted upon by the tilting force toward the leg plate side from the pinion, the stop portion can stop the movement of the leg plate toward the other leg plate side, and tilting of the piston and the cylinder toward the leg plate side can be suppressed. Moreover, the need to increase the strength of a frame and so forth can be eliminated, so the webbing retractor can be made compact and lightweight.

7 Claims, 7 Drawing Sheets

(56) References Cited

U.S. PATENT DOCUMENTS

| | | |
|---|---|---|
| 2010/0072313 A1* | 3/2010 | Maemura et al. ............ 242/379 |
| 2010/0123348 A1* | 5/2010 | Hiramatsu et al. ........... 297/476 |
| 2010/0200687 A1* | 8/2010 | Gray et al. ................... 242/374 |

FOREIGN PATENT DOCUMENTS

| | | |
|---|---|---|
| JP | 2001315618 A | 11/2001 |
| JP | 2003-335217 | 11/2003 |
| JP | 2006088780 | 4/2006 |
| JP | 2006213199 A | 8/2006 |
| WO | 2006052020 A1 | 5/2006 |
| WO | 2009123318 A1 | 10/2009 |

OTHER PUBLICATIONS

Japanese Office Action and English translation of notice of reasons for rejection dated Dec. 17, 2013.

* cited by examiner

WEBBING RETRACTOR

CROSS-REFERENCE TO RELATED APPLICATION

This application claims priority under 35 USC 119 from Japanese Patent Application No. 2010-209405 filed Sep. 17, 2010, the disclosure of which is incorporated by reference herein.

BACKGROUND OF THE INVENTION

1. Field of the Invention

The present invention relates to a webbing retractor in which webbing is retracted onto a retracting shaft due to a moving member being moved by the pressure of a gas that has been supplied to the inside of a cylinder member.

2. Related Art

In the seat belt retractor described in Japanese Patent Application Laid-Open (JP-A) No. 2003-335217, a gas is supplied to the inside of a cylinder main body portion of a cylinder portion and a rack is moved by the pressure of the gas, whereby a rack main body portion of the rack meshes with a pinion gear portion of a pinion gear body and the pinion gear body is rotated. Due to this, a retracting drum is rotated in a retraction (winding) direction and webbing is retracted onto the retracting drum.

Incidentally, the center of the rack main body portion in an axial direction of the pinion gear body is placed on one side (the opposite side of the retracting drum side) with respect to a central axis line inside the cylinder main body portion. For this reason, when the rack main body portion meshes with the pinion gear portion and the pinion gear body is rotated, the rack main body portion is acted upon by a tilting force toward the other side (the retracting drum side) from the pinion gear portion, and a tilting force toward the other side acts on the rack and the cylinder portion.

Here, if the rack and the cylinder portion are tilted toward the other side, the rack main body portion does not appropriately mesh with the pinion gear portion, so the efficiency with which the moving force of the rack is transmitted to the pinion gear body deteriorates, so the pinion gear body cannot be efficiently rotated by the movement of the rack.

For this reason, in this seat belt retractor, the strength of a housing body to which the cylinder portion is attached, the cylinder portion, the rack, and the pinion gear body are increased in order to suppress tilting of the rack and the cylinder portion toward the other side.

However, because the strength of the housing body, the cylinder portion, the rack, and the pinion gear body is increased in this manner, the seat belt retractor increases in size and weight.

SUMMARY OF THE INVENTION

In consideration of the above-described circumstances, it is an object of the present invention to obtain a webbing retractor in which tilting of a moving member and a cylinder member can be suppressed and which can be made compact and lightweight.

A webbing retractor of a first aspect of the invention includes: a retracting shaft onto which webbing worn by a passenger in a vehicle is retracted by the retracting shaft being rotated in a retraction direction; a cylinder member to whose inside a gas is supplied at a predetermined occasion; a rotating member by which the retracting shaft is rotated in the retraction direction by the rotating member being rotated; a moving member at which is disposed an engaging portion whose center in a rotation axis direction of the rotating member is placed on one side with respect to a central axis of the cylinder member in the rotation axis direction of the rotating member, the engaging portion engaging with the rotating member and the rotating member being rotated by the moving member being moved by pressure of the gas that is supplied to the inside of the cylinder member; a placement portion that is placed at the other side of the cylinder member in the rotation axis direction of the rotating member; and a stop portion that is placed at the other side of the placement portion in the rotation axis direction of the rotating member and is made capable of stopping the movement of the placement portion toward the other side.

A webbing retractor of a second aspect of the invention is the webbing retractor of the first aspect of the invention, wherein the stop portion is placed perpendicular with respect to the placement portion.

A webbing retractor of a third aspect of the invention is the webbing retractor of the first or second aspect of the invention, wherein the stop portion is fixed to a vehicle body.

In the webbing retractor of the first aspect, the moving member is moved by the pressure of the gas that has been supplied to the inside of the cylinder member at the predetermined occasion opportunity, whereby the engaging portion of the moving member engages with the rotating member and the rotating member is rotated. Due to this, the retracting shaft is rotated in the retraction direction and the webbing is retracted onto the retracting shaft.

Further, the placement member is placed at the other side of the cylinder member.

Moreover, the center of the engaging portion of the moving member in the axial direction of the rotating member is placed on the one side with respect to the central axis inside the cylinder member. For this reason, when the engaging portion of the moving member engages with the rotating member and the rotating member is rotated, a tilting force toward the other side is acted on the moving member from the rotating member, and a tilting force toward the other side acts on the moving member and the cylinder member.

Here, the stop portion is placed at the other side of the placement portion, and the stop portion is made capable of stopping the movement of the placement portion toward the other side. For this reason, even when the tilting force toward the other side acts on the moving member and the cylinder member and the moving force toward the other side acts on the placement member as described above, the stop portion can stop the movement of the placement portion toward the other side, and tilting of the moving member and the cylinder member toward the other side can be suppressed.

Moreover, the need to increase the strength of the placement portion, the cylinder member, the moving member, and the rotating member in order to suppress tilting of the moving member and the cylinder member toward the other side can be eliminated. For this reason, the webbing retractor can be made compact and lightweight.

In the webbing retractor of the second aspect, the stop portion is placed perpendicular with respect to the placement portion. For this reason, the stop portion can effectively stop the movement of the placement portion toward the other side, and tilting of the moving member and the cylinder member toward the other side can be effectively suppressed.

In the webbing retractor of the third aspect, the stop portion is fixed to the vehicle body side. For this reason, the stop portion can effectively stop the movement of the placement portion toward the other side, and tilting of the moving member and the cylinder member toward the other side can be effectively suppressed.

BRIEF DESCRIPTION OF THE DRAWINGS

An embodiment of the invention will be described in detail with reference to the following figures, wherein.

DETAILED DESCRIPTION OF THE INVENTION

Figure 1:
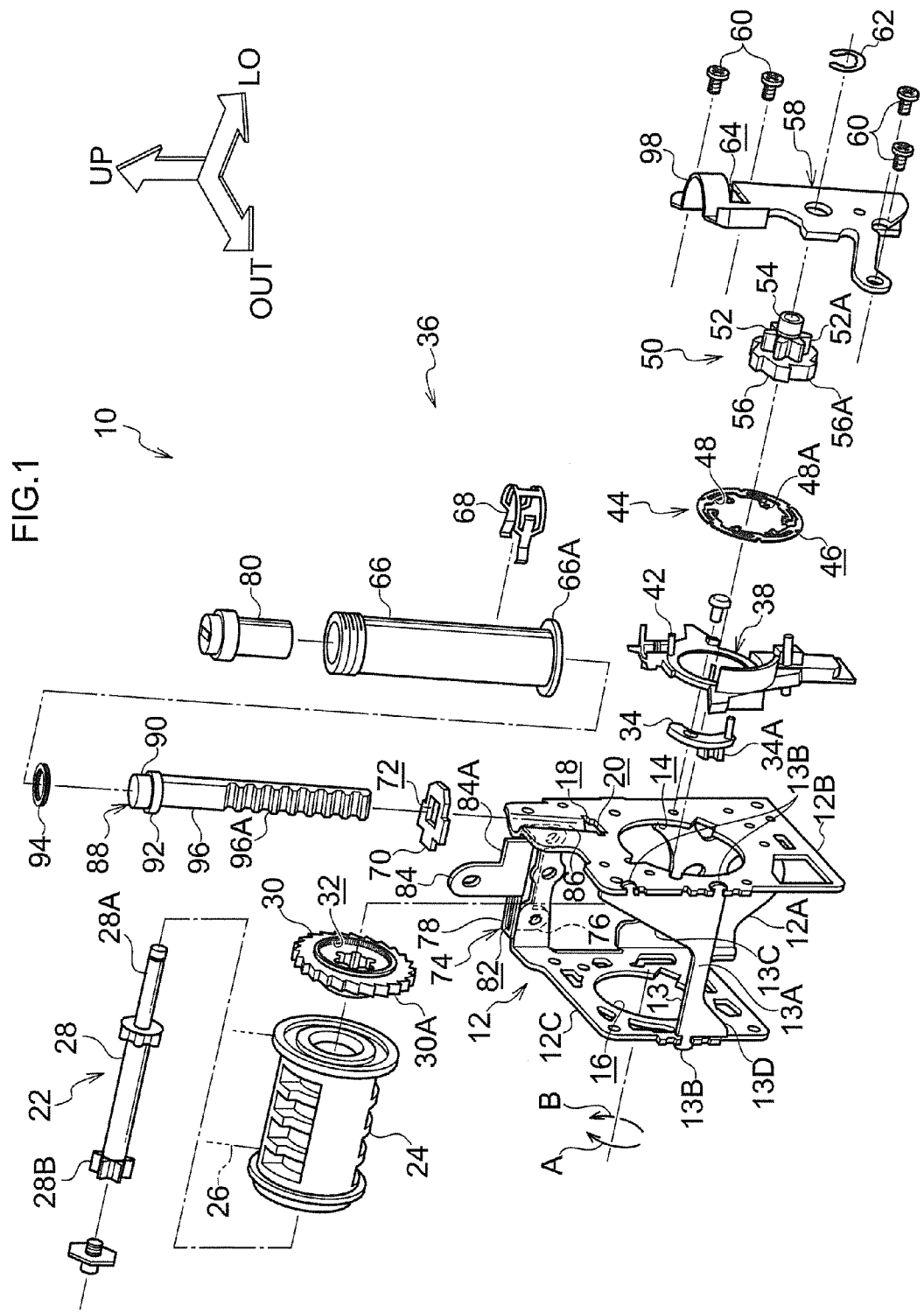
FIG. 1 is an exploded perspective view showing a webbing retractor pertaining to the embodiment of the invention as seen from outside in a vehicle width direction and one side in a vehicle front-and-rear direction.
Figure 2:
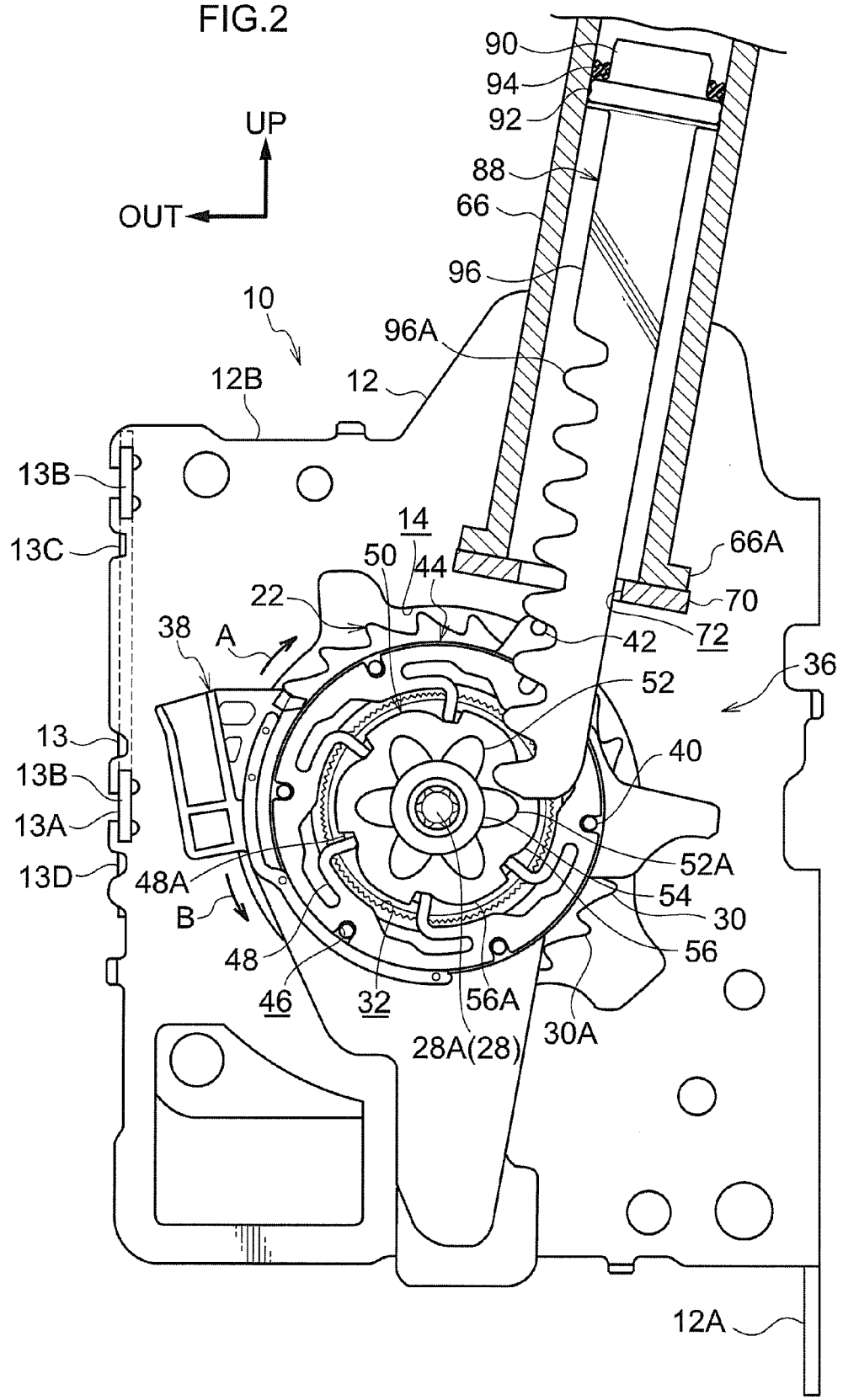
FIG. 2 is a side view showing the webbing retractor pertaining to the embodiment of the invention as seen from the one side in the vehicle front-and-rear direction.

In FIG. 1, a webbing retractor 10 pertaining to an embodiment of the invention is shown in an exploded perspective view as seen from outside in a vehicle width direction and one side in a vehicle front-and-rear direction. In FIG. 2, the webbing retractor 10 is shown in a side view as seen from the one side in the vehicle front-and-rear direction. In the drawings, arrow OUT represents outside in the vehicle width direction, arrow LO represents the one side in the vehicle front-and-rear direction, and arrow UP represents up.

As shown in FIG. 1 and FIG. 2, the webbing retractor 10 pertaining to the embodiment of the invention includes a cross-sectionally U-shaped metal plate-like frame 12 that serves as a placement member. The frame 12 has a back plate 12A that is disposed on the inner side in the vehicle width direction, a leg plate 12B that is disposed on the one side in the vehicle front-and-rear direction, and a leg plate 12C that is disposed on the other side in the vehicle front-and-rear direction.

A metal plate-like upper stay 74 that serves as an anchor (stop) member is disposed on the upper side of the back plate 12A.

Figure 5:
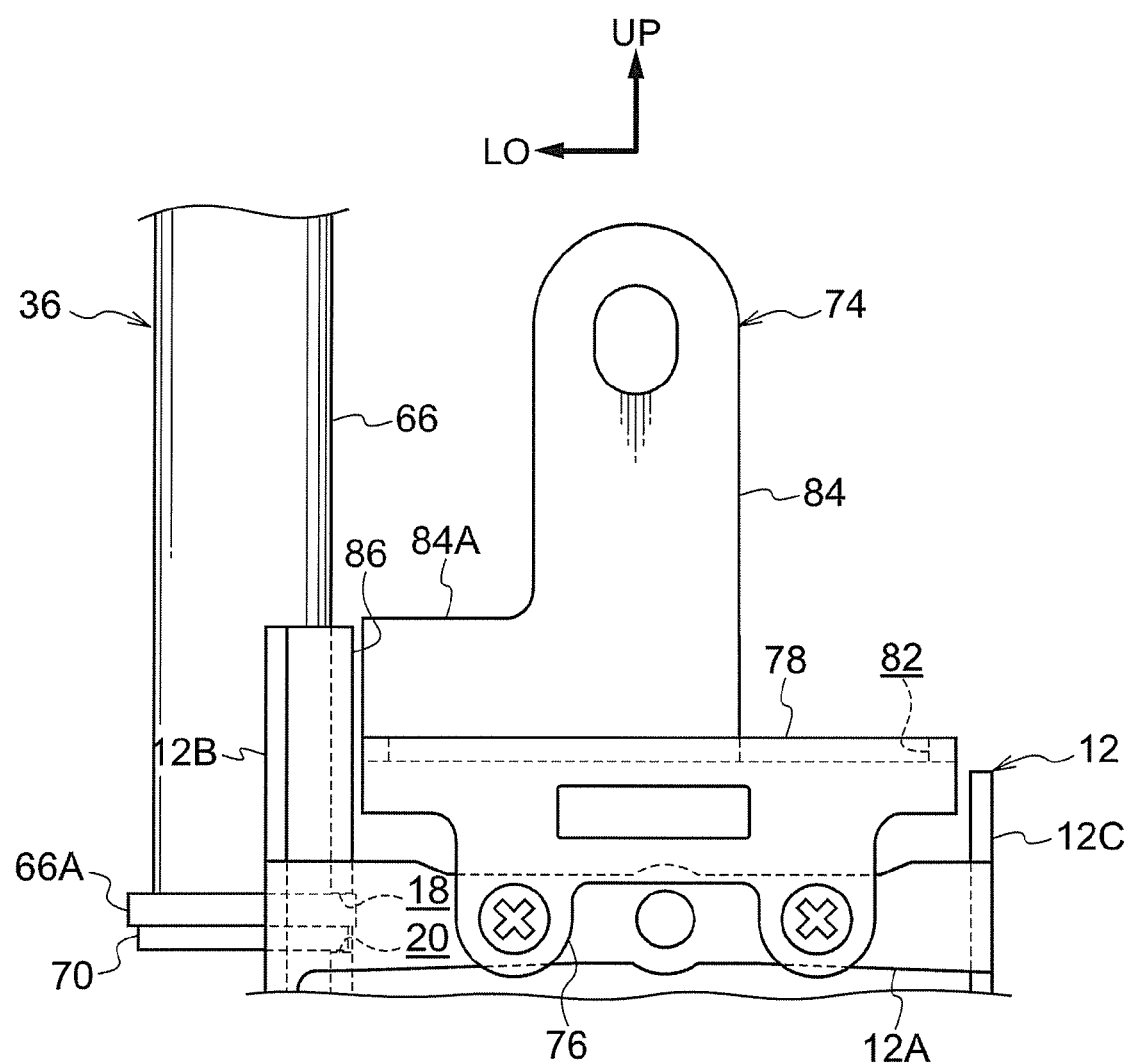
FIG. 5 is a side view showing main portions of the webbing retractor pertaining to the embodiment of the invention as seen from inside in the vehicle width direction.
Figure 6:
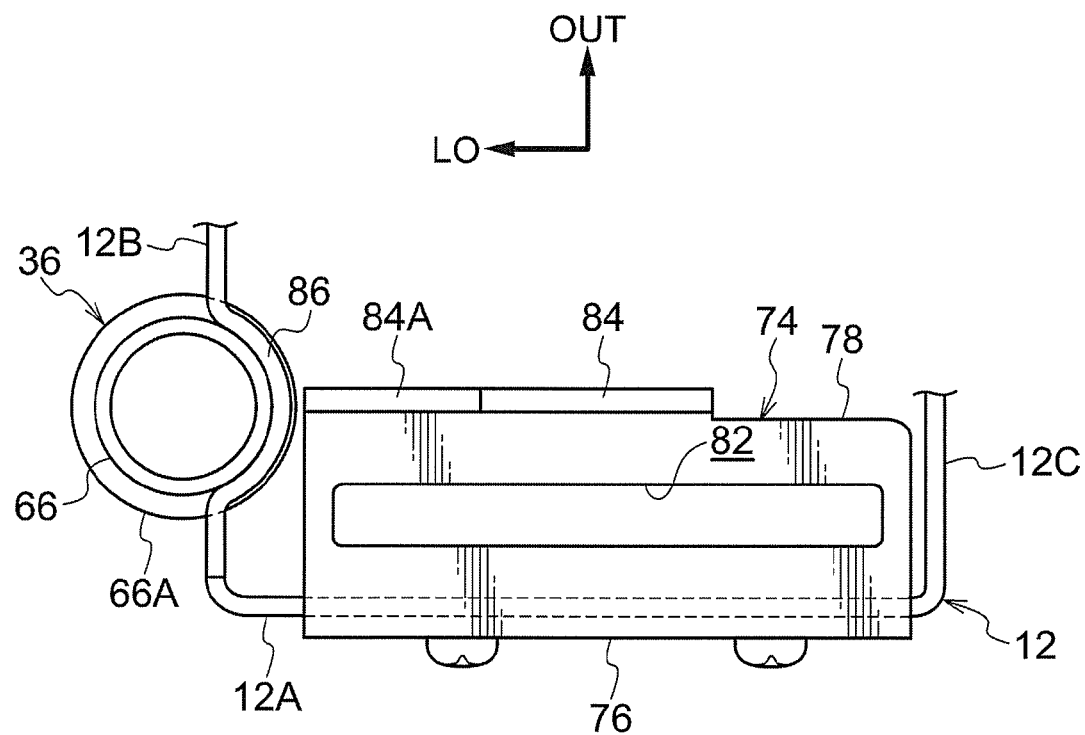
FIG. 6 is a plan view showing main portions of the webbing retractor pertaining to the embodiment of the invention as seen from above.

As shown in detail in FIG. 5 and FIG. 6, a flat plate-like fixing portion 76 is disposed on the lower side portion of the upper stay 74. The fixing portion 76 is fixed to the upper portion of the back plate 12A, whereby the upper stay 74 is fixed to the upper portion of the back plate 12A.

A long rectangular flat plate-like guide portion 78 is integrally disposed on the upper side of the fixing portion 76. The guide portion 78 extends horizontally from the upper end of the fixing portion 76 toward the inner side of the frame 12. A long rectangular guide hole 82 is penetratingly formed in the width direction center of the guide portion 78. The lengthwise direction of the guide hole 82 is placed parallel to the back plate 12A.

An L-shaped flat plate-like installing portion 84 is integrally disposed on the upper side of the guide portion 78. The installing portion 84 extends perpendicularly upward from the end portion of the guide portion 78 on the opposite side of the fixing portion 76 side. A rectangular flat plate-like stop portion 84A is formed on the portion on the lower side and on the leg plate 12B side of the installing portion 84. The stop portion 84A is placed perpendicular with respect to the leg plate 12B.

The frame 12 is fixed to a vehicle body at the lower portion of the back plate 12A, and the upper stay 74 is fixed to the vehicle body at the upper portion of the installing portion 84, whereby the webbing retractor 10 is installed in the vehicle.

Figure 7:
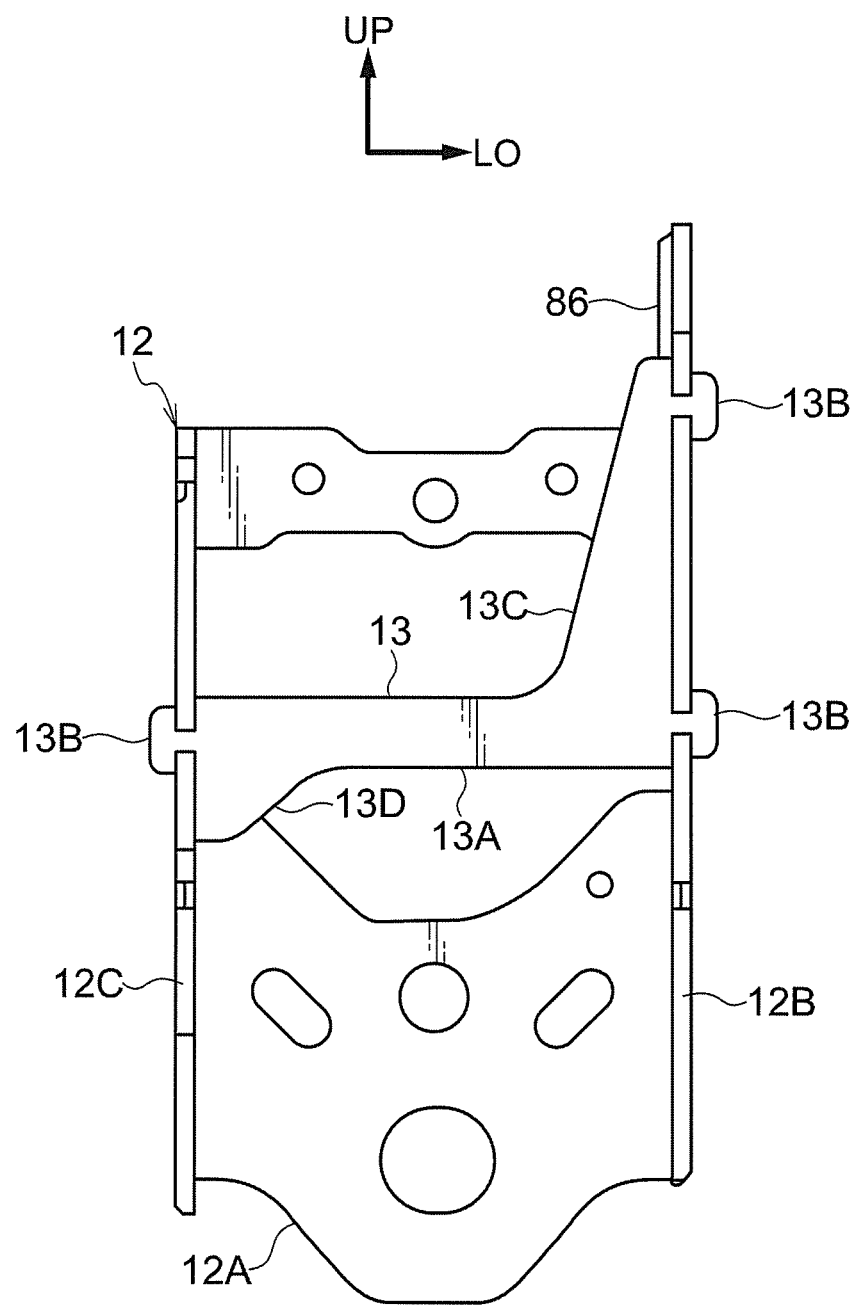
FIG. 7 is a front view showing a frame and a support plate of the webbing retractor pertaining to the embodiment of the invention as seen from outside in the vehicle width direction.

As shown in detail in FIG. 7, a flat plate-like support plate 13 that serves as a support member is disposed on the end portion which is on the opposite side of the back plate 12A side so as to bridge the leg plate 12B and the leg plate 12C of the frame 12. A long plate-like first support plate 13A that serves as a main body portion is disposed in the support plate 13. Substantially T-shaped plate-like fixing pieces 13B are integrally formed on, so as to project from, both end portions of the first support plate 13A. Both end portions of the first support plate 13A are fixed in calking manner, at the base end portions of the fixing pieces 13B, to the vertical direction middle portions (center portions) of the leg plate 12B and the leg plate 12C.

A substantially triangular plate-like second support plate 13C that serves as a support portion is integrally formed near the end portion of the first support plate 13A on the leg plate 12B side. The second support plate 13C extends upward from the first support plate 13A. A fixing piece 13B that is the same as described above is integrally formed on, so as to project from, the upper portion of the second support plate 13C. The upper portion of the second support plate 13C is fixed in calking manner, at the base end portion of the fixing piece 13B, to the leg plate 12B. The second support plate 13C contacts, in the vertical direction, a part of the portion of the leg plate 12B which is on the upper side of the first support plate 13A. The second support plate 13C supports the portion of the leg plate 12B which is on the upper side of the first support plate 13A and is capable of restricting the movement of the leg plate 12B toward the leg plate 12C side.

A substantially triangular plate-like third support plate 13D that serves as an additional support portion is integrally formed near the end portion of the first support plate 13A on the leg plate 12C side. The third support plate 13D extends downward from the first support plate 13A. The third support plate 13D contacts, in the vertical direction, a part of the portion of the leg plate 12C which is on the lower side of the first support plate 13A. The third support plate 13D supports the portion of the leg plate 12C which is on the lower side of the first support plate 13A and is capable of restricting the movement of the leg plate 12C toward the leg plate 12B side.

A circular placement hole 14 and a circular placement hole 16 are penetratingly formed in the leg plate 12B and the leg plate 12C, respectively, of the frame 12. The placement hole 14 and the placement hole 16 oppose each other.

A long rectangular first anchor hole 18 is penetratingly formed in the leg plate 12B on the back plate 12A side and on the upper side of the placement hole 14. The first anchor hole 18 is slanted slightly in a direction heading downward as going toward the back plate 12A side. A long rectangular second anchor hole 20 is penetratingly formed in the leg plate 12B directly under the first anchor hole 18. The second anchor hole 20 is placed parallel to the first anchor hole 18 and is communicated with the first anchor hole 18.

A placement wall 86 that serves as a placement portion is formed in the leg plate 12B from directly above the first anchor hole 18 to the upper edge of the leg plate 12B. The placement wall 86 is curved in a circular arc shape and projects toward the leg plate 12C side. Further, the lengthwise direction (axis-of-curvature direction) of the placement wall 86 is slanted slightly in a direction heading toward the back plate 12A side as going upward.

As shown in detail in FIG. 5 and FIG. 6, the stop portion 84A of the upper stay 74 is placed at the leg plate 12C side with respect to the placement wall 86 and is spaced slightly apart from the placement wall 86. The stop portion 84A opposes (faces) the width direction center portion of the placement wall 86 (particularly the upper portion of the placement wall 86) and is placed perpendicular with respect to the opposing portion (facing portion) of the placement wall 86 (particularly the upper portion of the placement wall 86).

That is, preferably, as seen from the above, an extending direction of the stop portion 84A (the upper stay 74) toward the placement wall 86 (the leg plate 12B) is perpendicular with respect to a tangent line at the opposing portion (facing portion) of the placement wall 86 which is curved in a circular arc shape (FIG. 6).

A retracting shaft 22 is rotatably supported (placed) between the leg plate 12B (the placement hole 14) and the leg plate 12C (the placement hole 16) of the frame 12.

A substantially cylindrical spool 24 that serves as a retracting member is disposed on the retracting shaft 22. Long band-like webbing 26 (a belt) is retracted (taken-up) from its base end side onto the spool 24. The webbing 26 extends upward from the back plate 12A side of the spool 24 and is inserted, so as to be movable in its lengthwise direction, through the guide hole 82 in the upper stay 74 (the guide portion 78). Because of this, the webbing 26 extends upward from the frame 12 and the upper stay 74 and is made capable of being worn on a passenger seated in a seat (not shown in the drawings) of the vehicle.

When the spool 24 is rotated in a retraction (take-up) direction (the direction of arrow A in FIG. 1 and FIG. 2), the webbing 26 is retracted onto the spool 24. When the webbing 26 is withdrawn (pulled out) from the spool 24, the spool 24 is rotated in a withdrawal (pulled out) direction (the direction of arrow B in FIG. 1 and FIG. 2). Further, the retraction and the withdrawal of the webbing 26 with respect to the spool 24 are guided by the guide hole 82 in the upper stay 74 (the guide portion 78).

A torsion shaft 28 that serves as an energy absorbing member that configures a force limiter mechanism is coaxially inserted inside the spool 24. One end 28A of the torsion shaft 28 on the leg plate 12B side projects from one end face of the spool 24 on the leg plate 12B side. Another end 28B of the torsion shaft 28 on the leg plate 12C side is fixed, so as to be incapable of relative rotation, inside the other end of the spool 24 on the leg plate 12C side. Thus, the torsion shaft 28 is made integrally rotatable with the spool 24.

A substantially cylindrical pillar shaped lock gear 30 that serves as an engaging member is disposed on the one end of the spool 24. The torsion shaft 28 coaxially penetrates the lock gear 30. The torsion shaft 28 is fixed, so as to be incapable of relative rotation, to the lock gear 30, and the lock gear 30 is made integrally rotatable with the torsion shaft 28. Further, ratchet teeth 30A (outer teeth) are formed on the entire outer periphery of the lock gear 30.

A cylindrical pillar shaped clutch recessed portion 32 that configures a clutch mechanism is formed in the face of the lock gear 30 on the opposite side of the spool 24 side. The coefficient of friction of the outer peripheral surface of the clutch recessed portion 32 is made high.

A biasing mechanism (not shown in the drawings) that serves as biasing means is disposed outside the leg plate 12C of the frame 12. The biasing mechanism is coupled to the spool 24 and causes a biasing force in the retraction direction to act on the spool 24.

A plate-like lock plate 34 that serves as a regulating member (a lock member) is rotatably supported on the leg plate 12B of the frame 12 near the placement hole 14. A lock tooth 34A is formed on the lock plate 34. The lock plate 34 is connected to a lock mechanism (not shown in the drawings) that serves as regulating means (lock means). When the webbing 26 is abruptly withdrawn from the spool 24 or when the vehicle is abruptly decelerated, the lock mechanism is actuated, whereby the lock plate 34 is rotated and the lock tooth 34A meshes (locks) with the ratchet teeth 30A of the lock gear 30. Because of this, the rotation of the lock gear 30 in the withdrawal direction is regulated (locked) and the rotation of the spool 24 in the withdrawal direction is regulated (the rotation of the spool 24 in the retraction direction is allowed).

A pretensioner mechanism 36 resulting from a rack-and-pinion system is disposed outside the leg plate 12B of the frame 12.

A substantially annular gear case 38 that is made of resin and serves as a holding member is disposed in the pretensioner mechanism 36. The gear case 38 is fixed to the leg plate 12B. The outer peripheral portion of the gear case 38 covers the outer peripheral portion of the lock gear 30. The clutch recessed portion 32 of the lock gear 30 is placed inside the gear case 38, and the one end 28A of the torsion shaft 28 penetrates the gear case 38.

A predetermined number of cylindrical pillar shaped holding pins 40 (share pins) are integrally formed on the outer peripheral portion of the gear case 38. The holding pins 40 project from the gear case 38 toward the opposite side of the lock gear 30 side. A cylindrical pillar shaped anchor pin 42 (share pin) is integrally formed on the upper portion of the gear case 38. The anchor pin 42 projects from the gear case 38 toward the opposite side of the leg plate 12B side.

A substantially annular plate-like clutch plate 44 that serves as a clutch member that configures the clutch mechanism is placed on the side of the gear case 38 on the opposite side of the lock gear 30 side. A predetermined number of semicircular attachment holes 46 are formed in the outer peripheral edge of the clutch plate 44. The predetermined number of attachment holes 46 are placed at equal intervals along the circumferential direction of the clutch plate 44. The holding pins 40 of the gear case 38 are fitted into the attachment holes 46, whereby the clutch plate 44 is held on the gear case 38.

A predetermined number (six in the present embodiment) of L-shaped plate-like extension portions 48 are integrally formed on the inner periphery of the clutch plate 44. The predetermined number of extension portions 48 are placed at equal intervals along the circumferential direction of the clutch plate 44. Columnar biting portions 48A are integrally formed on the distal ends of the extension portions 48. The biting portions 48A project from the extension portions 48 toward the gear case 38 side and are inserted inside the clutch recessed portion 32 of the lock gear 30 via the inside of the gear case 38. The biting portions 48A are spaced apart from the outer peripheral surface of the clutch recessed portion 32, and the clutch plate 44 allows the rotation of the lock gear 30.

A pinion 50 that serves as a rotating member is disposed on the inner peripheral side of the clutch plate 44. The one end 28A of the torsion shaft 28 coaxially and relatively rotatably penetrates the pinion 50. A gear 52 is coaxially disposed on the axial direction middle portion of the pinion 50, and pinion teeth 52A are formed on the entire outer periphery of the gear 52. Moreover, a cylindrical support cylinder (tube) 54 is coaxially formed on the portion of the pinion 50 on the opposite side of the lock gear 30 side.

A clutch portion 56 that configures the clutch mechanism is coaxially formed on the portion of the pinion 50 on the lock gear 30 side. The clutch portion 56 is inserted inside the clutch recessed portion 32 of the lock gear 30. A predetermined number (six in the present embodiment) of convex portions 56A are formed on the outer peripheral surface of the clutch portion 56. The predetermined number of convex portions 56A are placed at equal intervals along the circumferential direction of the clutch portion 56, and the height to which they project is made higher gradually in the withdrawal direction. The biting portions 48A of the clutch plate 44 are attached to (in pressure-contact with) the clutch portion 56 at the retraction direction-side portions of the convex portions 56A respectively, whereby the pinion 50 is held in the clutch plate 44.

A metal plate-like cover plate 58 that serves as an assembly member is disposed outside the leg plate 12B of the frame 12. The cover plate 58 is fixed (fastened) to the leg plate 12B by multiple fixing screws 60. The cover plate 58 covers the gear case 38, the clutch plate 44, and the pinion 50 from the opposite side of the lock gear 30 side.

The support cylinder 54 of the pinion 50 penetrates the cover plate 58, and the cover plate 58 supports the pinion 50 such that the pinion 50 can freely rotate. A K-ring 62 that is substantially C-shaped when seen in a front view and serves as an anchor member is fitted together with and fixed to the support cylinder 54 of the pinion 50 on the side of the cover plate 58 on the opposite side of the leg plate 12B side. The K-ring 62 is anchored to the cover plate 58, whereby the detachment of the pinion 50 from the cover plate 58 is regulated.

A long rectangular third anchor hole 64 is penetratingly formed in the upper portion of the cover plate 58. The third anchor hole 64 is slanted slightly in a direction heading downward as going toward the back plate 12A side and opposes (faces) the first anchor hole 18 and the second anchor hole 20 in the leg plate 12B.

An assembly wall 98 that serves as an assembly portion is formed in the cover plate 58 from directly above the third anchor hole 64 to the upper edge of the cover plate 58. The assembly wall 98 is curved in a circular arc shape and projects toward the opposite side of the leg plate 12B side. Further, the axis-of-curvature direction of the assembly wall 98 is slanted slightly in a direction heading toward the back plate 12A side as going upward.

A cylindrical cylinder 66 that serves as a cylinder (tube) member is disposed between the upper portion of the leg plate 12B of the frame 12 and the upper portion of the cover plate 58. The cylinder 66 extends upward from the leg plate 12B and the cover plate 58.

The cylinder 66 is fitted between the placement wall 86 of the leg plate 12B and the assembly wall 98 of the cover plate 58. Moreover, the cylinder 66 is fitted inside a cross-sectionally substantially U-shaped plate-like cylinder holder 68 on the upper side of the cover plate 58. The cylinder holder 68 is, at both of its lengthwise direction end portions, engaged with the upper portion of the leg plate 12B so fixed to the leg plate 12B. Due to this, the placement wall 86, the assembly wall 98, and the cylinder holder 68 regulate the movement of the cylinder 66 in its radial direction. Further, the cylinder 66 is inserted inside the placement wall 86 of the leg plate 12B, whereby the webbing retractor 10 is made compact.

A peripheral edge portion 66A is integrally formed on the lower end of the cylinder 66. The peripheral edge portion 66A projects from the entire outer periphery of the cylinder 66. The peripheral edge portion 66A is fitted together with the first anchor hole 18 in the leg plate 12B and the third anchor hole 64 in the cover plate 58 (the upper side portion).

A substantially rectangular plate-like piston stopper 70 that serves as a stopper member is placed directly under the cylinder 66. The piston stopper 70 is brought into contact (surface-contact) with the lower end of the cylinder 66 (including the peripheral edge portion 66A) and is fitted together with the second anchor hole 20 in the leg plate 12B and the third anchor hole 64 in the cover plate 58 (the lower side portion). Due to this, the movement of the piston stopper 70 and the movement of the cylinder 66 in its axial direction are locked, and the piston stopper 70 and the cylinder 66 are fixed between the leg plate 12B and the cover plate 58.

A rectangular insertion hole 72 is penetratingly formed in the piston stopper 70. The inside of the cylinder 66 opens to the upper side of the pinion 50 via the insertion hole 72.

Figure 4:
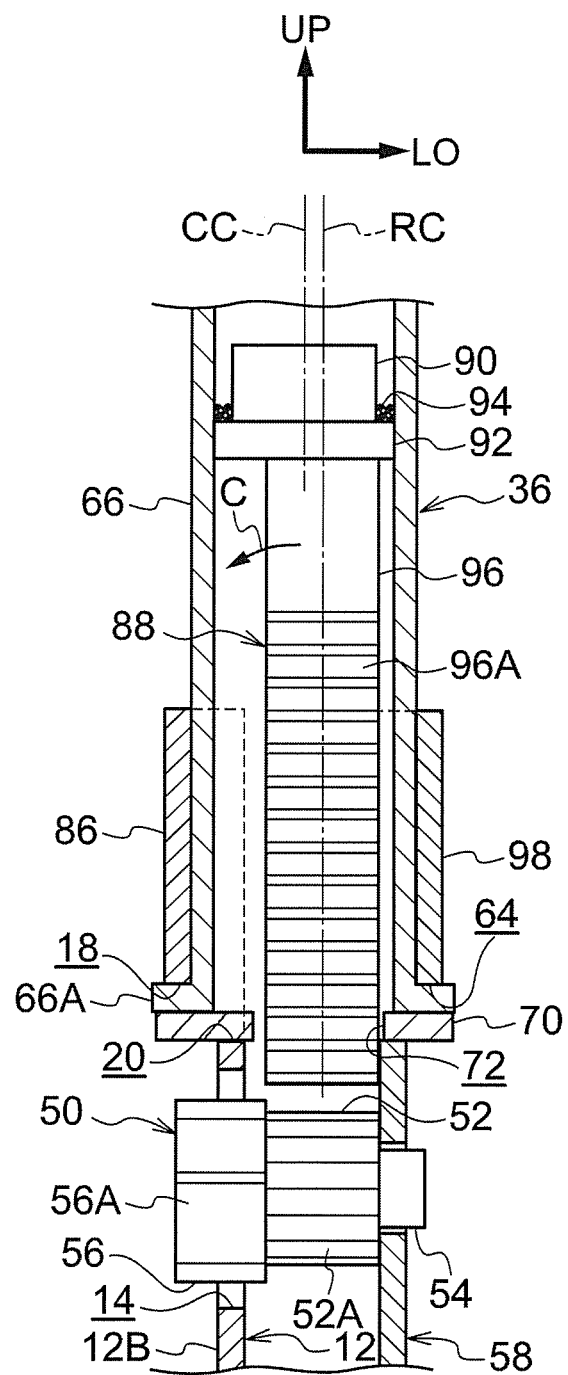
FIG. 4 is a cross-sectional view showing main portions of the webbing retractor pertaining to the embodiment of the invention as seen from outside in the vehicle width direction.

As shown in detail in FIG. 4, a central axis CC of the cylinder 66 (a central axis inside the cylinder 66) is placed on the leg plate 12B side (the other side in a rotation axis direction of the pinion 50) with respect to the axial direction center of the gear 52 of the pinion 50.

A substantially cylindrical pillar shaped gas generator 80 that serves as driving means is fitted into and fixed to the upper end of the inside of the cylinder 66. The gas generator 80 closes off the upper end of the cylinder 66. The gas generator 80 is electrically connected to a control device (not shown in the drawings) of the vehicle. At the time of an impact of the vehicle (a predetermined opportunity that is an emergency of the vehicle when an impact of the vehicle has been detected), the pretensioner mechanism 36 is actuated by the control of the control device, whereby the gas generator 80 instantaneously generates a high-pressure gas and supplies the high-pressure to the upper end of the inside of the cylinder 66.

A piston 88 that serves as a moving member is disposed inside the cylinder 66.

A cylindrical pillar shaped base portion 90 is disposed on the upper end of the piston 88. The base portion 90 is placed coaxially with the cylinder 66. A disc-shaped flange 92 is disposed directly under the base portion 90 on the piston 88. The flange 92 is placed coaxially with the cylinder 66, projects from the entire outer periphery of the base portion 90, and is substantially fitted together with the inner peripheral surface of the cylinder 66.

An annular and cross-sectionally X-shaped X-ring 94 that serves as a seal member is placed on the outer periphery of the base portion 90. The X-ring 94 is made of rubber or the like and has elasticity and a sealing property. The X-ring 94 contacts, in an elastically deformed state, the whole circumferences of the outer peripheral surface of the base portion 90, the upper surface of the flange 92, and the inner peripheral surface of the cylinder 66. The X-ring 94 seals the area between the cylinder 66 and the piston 88.

A substantially rectangular prism-like rack 96 that serves as an engaging portion is disposed on the piston 88 on the lower side of the flange 92. Rack teeth 96A are formed on the portion of the rack 96 on the opposite side of the back plate 12A side. The rack teeth 96A are arranged perpendicular with respect to the lengthwise direction (axial direction) of the rack 96. The rack 96 projects from the lower end of the cylinder 66 and is inserted through the insertion hole 82 in the piston stopper 70. The rack teeth 96A are caught on the anchor pin 42 of the gear case 38, whereby the lower end of the rack 96 is placed near the upper side of the gear teeth 52 of the pinion 50.

As shown in detail in FIG. 4, the rack 96 is placed offset on the opposite side of the leg plate 12B side (the one side) with respect to the base portion 90 and the flange 92. A center RC of the rack 96 and the rack teeth 96A in the axial direction of the pinion 50 (the gear 52) is placed on the opposite side of the leg plate 12B side with respect to the central axis CC of the cylinder 66 (the central axis of the base portion 90 and the flange 92). Due to this, the placement range of the rack 96 and the rack teeth 96A in the axial direction of the pinion 50 coincides with the placement range of the gear 52 in the axial direction, and the center RC of the rack 96 and the rack teeth 96A in the axial direction of the pinion 50 coincides with the axial direction center of the gear 52.

Next, the operation of the present embodiment will be described.

In the webbing retractor 10 of the above configuration, when the webbing 26 is worn on a passenger seated in the seat of the vehicle, the biasing mechanism causes a biasing force in the retraction direction to act on the spool 24, whereby slack in the webbing 26 is eliminated.

At the time of an impact of the vehicle, the webbing 26 is abruptly withdrawn from the spool 24, the vehicle is abruptly decelerated, and the lock mechanism is actuated, whereby the lock tooth 34A of the lock plate 34 meshes with the ratchet teeth 30A of the lock gear 30. Due to this, the rotation of the lock gear 30 in the withdrawal direction is regulated and the movement of the spool 24 in the withdrawal direction is regulated, whereby the withdrawal of the webbing 26 from the spool 24 is regulated and the webbing 26 restrains the passenger.

Moreover, at the time of an impact of the vehicle, the pretensioner mechanism 36 is actuated by the control of the control device, whereby the gas generator 80 instantaneously generates a high-pressure gas and supplies the high-pressure gas to the upper end (an end on one axial direction) of the inside of the cylinder 66. For this reason, the piston 88 (the base portion 90 and the flange 92) and the X-ring 94 receive the pressure of the gas from above while the state in which the area between the cylinder 66 and the piston 88 is sealed by the X-ring 94 is maintained, whereby the anchor pin 42 of the gear case 38 that locks the rack 96 (the rack teeth 96A) of the piston 88 is broken by the rack teeth 96A, and the piston 88 and the X-ring 94 are moved downward (toward the other axial direction side inside the cylinder 66) along the axial direction of the cylinder 66. Because of this, the rack 96 (the rack teeth 96A) of the piston 88 meshes (engages) with the gear 52 (the pinion teeth 52A) of the pinion 50, and the pinion 50 is rotated in the retraction direction.

When the pinion 50 has been rotated in the retraction direction, the biting portions 48A of the clutch plate 44 are moved from the retraction direction-side portions to the withdrawal direction-side portions of the convex portions 56A in the clutch portion 56 of the pinion 50, whereby the biting portion 48A is moved toward the outer peripheral surface side of the clutch recessed portion 32 of the lock gear 30 while the extension portions 48 of the clutch plate 44 are deformed and moved toward the outer peripheral side of the clutch plate 44. For this reason, the biting portion 48A bites into (engages with) the area between the clutch portion 56 (the peripheral surface of the convex portion 56A) and the lock gear 30 (the outer peripheral surface of the clutch recessed portion 32), whereby the pinion 50, the clutch plate 44, the lock gear 30, the torsion shaft 28, and the spool 24 are made integrally rotatable. Due to this, the holding pin 40 of the gear case 38 that is fitted into the attachment hole 46 in the clutch plate 44 is broken by the peripheral edge of the attachment hole 46 and the holding of the clutch plate 44 on the gear case 38 is released, whereby the pinion 50, the clutch plate 44, the lock gear 30, the torsion shaft 28, and the spool 24 are integrally rotated in the retraction direction. For this reason, the webbing 26 is retracted onto the spool 24 and the force with which the passenger is restrained by the webbing 26 is increased.

Figure 3:
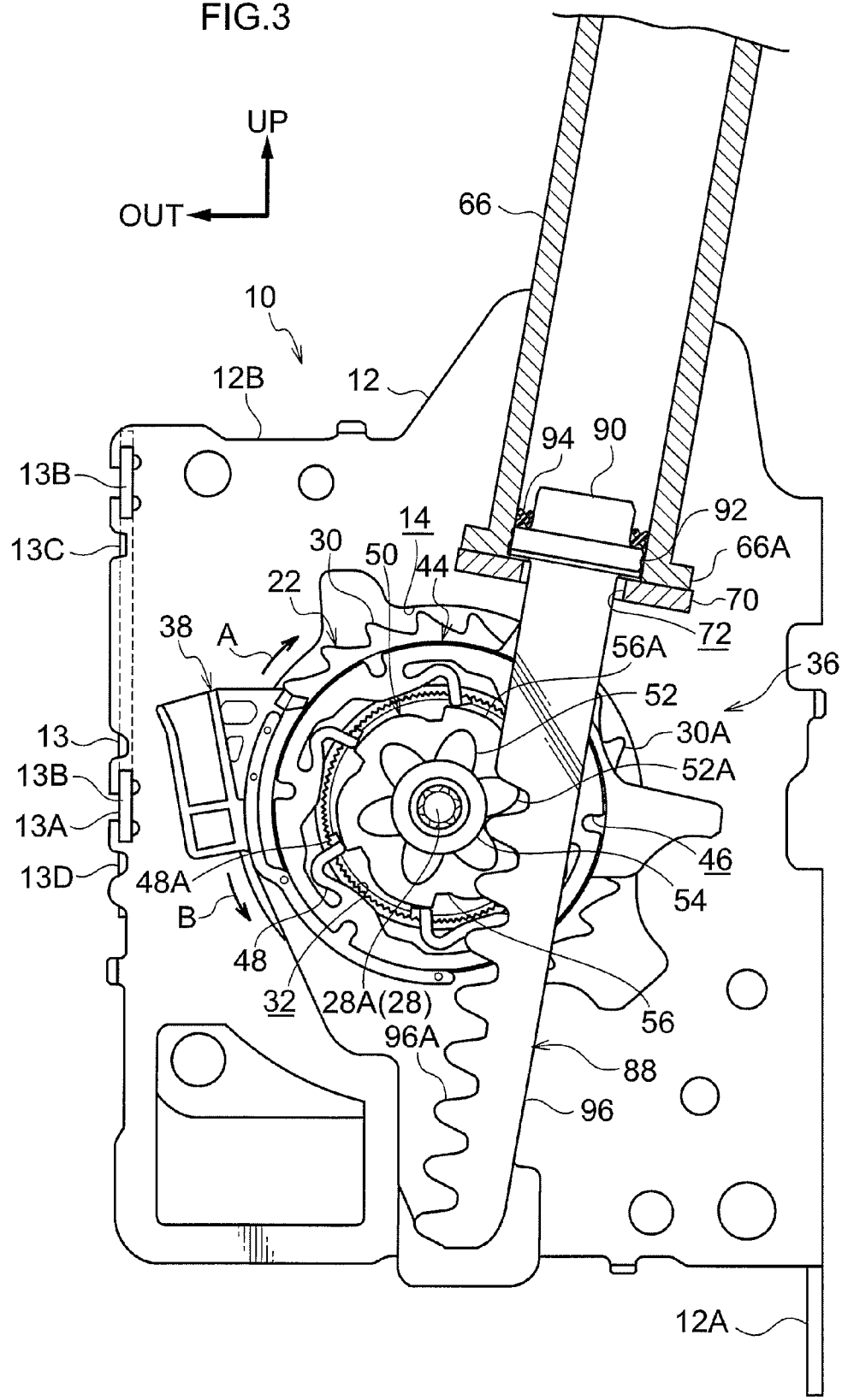
FIG. 3 is a side view showing a state after the actuation of a pretensioner mechanism in the webbing retractor pertaining to the embodiment of the invention as seen from the one side in the vehicle front-and-rear direction.

As shown in FIG. 3, when the flange 92 of the piston 88 makes contact with the piston stopper 70, the downward movement of the piston 88 and the X-ring 94 is stopped and the actuation of the pretension mechanism 36 is ended.

Incidentally, in the piston 88, the placement range of the rack 96 and the rack teeth 96A in the axial direction of the pinion 50 (the gear 52) coincides with the placement range of the gear 52 in its axial direction, and the center RC of the rack 96 and the rack teeth 96A in the axial direction of the pinion 50 coincides with the axial direction center of the gear 52.

For this reason, when the rack 96 meshes with the gear 52 and the pinion 50 is rotated in the retraction direction as a result of the piston 88 being moved downward along the axial direction of the cylinder 66 as described above, the rack 96 (the rack teeth 96A) can appropriately mesh with the gear 52 (the pinion teeth 52A). Due to this, the moving force of the piston 88 can be efficiently transmitted to the pinion 50, and the pinion 50 can be efficiently rotated by the movement of the piston 88.

Further, in the piston 88, the rack 96 is placed offset to the opposite side of the leg plate 12B side (the one side in the rotation axis direction of the pinion 50) with respect to the base portion 90 and the flange 92, and the center RC of the rack 96 and the rack teeth 96A in the rotation axis direction of the pinion 50 is placed on the opposite side of the leg plate 12B side (the one side in the rotation axis direction of the pinion 50) with respect to the central axis CC of the cylinder 66 (the central axis of the base portion 90 and the flange 92).

For this reason, when the rack 96 meshes with the gear 52 and the pinion 50 is rotated in the retraction direction as a result of the piston 88 being moved downward along the axial direction of the cylinder 66 as described above, the piston 88 (the rack teeth 96A) is acted upon by a tilting force toward the leg plate 12B side (the other side, which is the side of arrow C in FIG. 4) from the pinion 50 (the pinion teeth 52A), and a tilting force toward the leg plate 12B side acts on the piston 88 and the cylinder 66.

Here, the stop portion 84A of the upper stay 74 (the installing portion 84) is placed at the leg plate 12C side (the other side in the rotation axis direction of the pinion 50) of the placement wall 86 of the leg plate 12B to which the cylinder 66 is assembled (fixed), and the stop portion 84A is made capable of stopping the movement of the placement wall 86 toward the leg plate 12C side.

For this reason, as described above, even when the tilting force toward the leg plate 12B side acts on the piston 88 and the cylinder 66 and a moving force (tilting force) toward the leg plate 12C side acts on the placement wall 86, the stop portion 84A can stop the movement (tilting) of the placement wall 86 toward the leg plate 12C side, and tilting of the piston 88 and the cylinder 66 toward the leg plate 12B side can be suppressed. Due to this, the rack 96 (the rack teeth 96A) can appropriately mesh with the gear 52 (the pinion teeth 52A), the moving force of the piston 88 can be efficiently transmitted to the pinion 50, and the pinion 50 can be efficiently rotated by the movement of the piston 88.

Further, the stop portion 84A of the upper stay 74 opposes (faces) the width direction center portion of the placement wall 86 (particularly the upper portion of the placement wall 86) and is placed perpendicular with respect to the opposing (facing) portion of the placement wall 86 (particularly the upper portion of the placement wall 86). For this reason, the stop portion 84A can effectively stop the movement of the placement wall 86 toward the leg plate 12C side, tilting of the piston 88 and the cylinder 66 toward the leg plate 12B side can be effectively suppressed.

Moreover, the installing portion 84 of the upper stay 74 on which the stop portion 84A is disposed is fixed to the vehicle body side, and the back plate 12A of the frame 12 to which the upper stay 74 is fixed to the vehicle body side. For this reason, the stop portion 84A can even more effectively stop the movement of the placement wall 86 toward the leg plate 12C side, and tilting of the piston 88 and the cylinder 66 toward the leg plate 12B side can be even more effectively suppressed.

Moreover, the second support plate 13C of the support plate 13 that bridges the leg plate 12B and the leg plate 12C of the frame 12 contacts, in the vertical direction, the part of the portion of the leg plate 12B on the upper side with respect to the first support plate 13A. For this reason, the second support plate 13C can restrict the movement of the leg plate 12B toward the leg plate 12C side, whereby the movement of the placement wall 86 toward the leg plate 12C side can be restricted, and tilting of the piston 88 and the piston 66 toward the leg plate 12B side can be even more effectively suppressed.

Further, the need to increase the strength of the frame 12 (the placement wall 86), the cylinder 66, the piston 88 (the rack 96), and the pinion 50 (the gear 52) in order to suppress tilting of the piston 88 and the cylinder 66 toward the leg plate 12B side can be eliminated. For this reason, the webbing retractor 10 can be made compact and lightweight.

Moreover, the upper stay 74 has the function of installing the webbing retractor 10 in the vehicle at the installing portion 84 and has the function of guiding the retraction and the withdrawal of the webbing 26 with respect to the spool 24 at the guide portion 78 (the guide hole 82), and the stop portion 84A is formed in the upper stay 74. For this reason, the number of parts can be prevented from increasing, and the webbing retractor 10 can be made even more compact and lightweight.

Further, the stop portion 84A of the upper stay 74 is spaced slightly apart from the placement wall 86 of the leg plate 12B. It is preferable that a distance between the leg plate 12B side end portion (the placement wall 86 side end portion) of the stop portion 84A and the opposing portion (facing portion) of the placement wall 86 is set in a range which is more than or equal to 0.2 mm and less than or equal to 2.2 mm (more preferably, less than or equal to 1.2 mm, further preferably, less than or equal to 0.3 mm). For this reason, the sound of contact between the stop portion 84A and the placement wall 86 due to vibration at the time when the vehicle travels can be prevented from occurring.

What is claimed is:

1. A webbing retractor comprising:
   a retracting shaft onto which webbing worn by a passenger in a vehicle is retracted by the retracting shaft being rotated in a retraction direction;
   a cylinder member to whose inside a gas is supplied at a predetermined occasion;
   a rotating member by which the retracting shaft is rotated in the retraction direction by the rotating member being rotated;
   a moving member at which is disposed an engaging portion whose center in a rotation axis direction of the rotating member is placed on one side with respect to a central axis of the cylinder member in the rotation axis direction of the rotating member, the engaging portion engaging with the rotating member and the rotating member being rotated by the moving member being moved by pressure of the gas that is supplied to the inside of the cylinder member;
   a placement portion that is placed at another side of the cylinder member in the rotation axis direction of the rotating member; and
   a stop portion that is placed adjacent to the another side of the placement portion in the rotation axis direction of the rotating member and that faces the placement portion in the rotation axis direction of the rotating member, the stop portion also facing the cylinder member via the placement portion in the rotation axis direction of the rotating member, such that the stop portion is capable of stopping the movement of the placement portion toward the another side.

2. The webbing retractor of claim 1, wherein the stop portion is placed perpendicular with respect to the placement portion.

3. The webbing retractor of claim 1, wherein the stop portion is fixed to the vehicle.

4. The webbing retractor of claim 1, wherein the stop portion is fixed to the vehicle.

5. The webbing retractor of claim 1 further comprising:
   a frame that is configured by a back plate and a pair of leg plates extending from the back plate, the retracting shaft being provided between the pair of the leg plates, and the placement portion being formed at one of the pair of leg plates, and
   a stay member at which the stop portion is formed, the member and the frame being independent members.

6. The webbing retractor of claim 5, wherein the frame is fixed to the vehicle and the stay member is fixed to the vehicle.

7. The webbing retractor of claim 1, wherein a space is provided between the stop portion and the placement portion in the rotation axis direction of the rotating member.

* * * * *